US008214070B2

(12) United States Patent
Grossmann et al.

(10) Patent No.: US 8,214,070 B2
(45) Date of Patent: Jul. 3, 2012

(54) METHOD AND DEVICE FOR CONTROLLING AN ACTUATOR

(75) Inventors: Alex Grossmann, Leonberg (DE); Mattias Hallor, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 1329 days.

(21) Appl. No.: 11/666,831

(22) PCT Filed: Nov. 3, 2005

(86) PCT No.: PCT/EP2005/055720

§ 371 (c)(1),
(2), (4) Date: Sep. 10, 2007

(87) PCT Pub. No.: WO2006/048432

PCT Pub. Date: May 11, 2006

(65) Prior Publication Data

US 2011/0133106 A1 Jun. 9, 2011

(30) Foreign Application Priority Data

Nov. 5, 2004 (DE) ........................ 10 2004 053 391

(51) Int. Cl.
*G06F 19/00* (2006.01)

(52) U.S. Cl. ........................................ 700/108; 700/287

(58) Field of Classification Search .................. 700/108, 700/287

See application file for complete search history.

(56) References Cited

U.S. PATENT DOCUMENTS

| | | | | |
|---|---|---|---|---|
| 5,205,132 | A * | 4/1993 | Fu | 62/208 |
| 5,498,956 | A * | 3/1996 | Kinney et al. | 324/142 |
| 5,521,824 | A * | 5/1996 | Eagan et al. | 701/101 |
| 6,137,187 | A * | 10/2000 | Mikhail et al. | 290/44 |
| 6,697,685 | B1 * | 2/2004 | Caldwell | 700/71 |
| 6,845,750 | B2 * | 1/2005 | Matischuk et al. | 123/339.19 |
| 6,880,332 | B2 * | 4/2005 | Pfaff et al. | 60/422 |
| 7,127,882 | B2 * | 10/2006 | Pfaeffle et al. | 60/285 |
| 7,142,931 | B2 * | 11/2006 | Frutiger | 700/72 |
| 7,174,777 | B2 * | 2/2007 | Fischer et al. | 73/114.33 |
| 7,308,322 | B1 * | 12/2007 | Discenzo et al. | 700/28 |
| 7,539,549 | B1 * | 5/2009 | Discenzo et al. | 700/28 |
| 2002/0008149 | A1 * | 1/2002 | Riley et al. | 236/49.3 |
| 2002/0037790 | A1 * | 3/2002 | Carl et al. | 477/79 |
| 2003/0084873 | A1 | 5/2003 | Ishida et al. | |

(Continued)

FOREIGN PATENT DOCUMENTS

DE 43 03 560 8/1994

(Continued)

*Primary Examiner* — Albert Decady
*Assistant Examiner* — Anthony Whittington
(74) *Attorney, Agent, or Firm* — Kenyon & Kenyon LLP

(57) ABSTRACT

In a method and a device for controlling an actuator, the first setpoint value for the position of the actuator is predefined. A change in the setpoint value for the control of the actuator to the first setpoint value is limited to a first setpoint value change limitation. For the reaching of the first setpoint value, a second setpoint value is predefined. A change in the setpoint value for the position of the actuator to the second setpoint value is limited to a second setpoint value change limitation. If the actual value of the change of the setpoint value to the first setpoint value using the first setpoint value change limitation would be greater than the change of the setpoint value to the second setpoint value using the second setpoint value change limitation, the first setpoint value is predefined for the setpoint value and the change in the setpoint value for the control of the actuator to the first setpoint value is limited according to the first setpoint value change limitation.

9 Claims, 3 Drawing Sheets

U.S. PATENT DOCUMENTS

| | | | | |
|---|---|---|---|---|
| 2003/0107265 | A1* | 6/2003 | Arnold | 303/139 |
| 2004/0094964 | A1* | 5/2004 | Mikhail et al. | 290/44 |
| 2004/0207208 | A1* | 10/2004 | Mikhail et al. | 290/44 |
| 2005/0253396 | A1* | 11/2005 | Mikhail et al. | 290/44 |
| 2009/0212725 | A1* | 8/2009 | Wallner | 318/400.3 |

FOREIGN PATENT DOCUMENTS

| | | |
|---|---|---|
| EP | 0 992 662 | 4/2000 |

* cited by examiner

METHOD AND DEVICE FOR CONTROLLING AN ACTUATOR

BACKGROUND OF THE INVENTION

1. Field of the Invention

The present invention is directed to a method and a device for controlling an actuator in a motor vehicle.

2. Description of Related Art

A digital regulation in an engine controller is frequently used to regulate electrically controlled actuators in a motor vehicle, e.g., a throttle valve, a charge motion valve, an exhaust gas recirculation valve, a bypass valve for a compressor, etc. In order to avoid damage to the respective actuator, it must be prevented that a mechanical stop of the respective actuator is approached too quickly. In order to ensure this, an offset to the stop is established so that the actuator may be moved quickly up to this offset. However, an increased leakage mass flow is a condition of this offset. An alternative approach uses a setpoint value change limitation using a filter, for example. A change in the setpoint value for the position of the actuator is limited to a predefined setpoint value according to the setpoint value change limitation. The setpoint value change is limited to such a low value that it is able to be ensured that the actuator does not approach the stop too quickly. If this setpoint value change limitation is active across the entire range of predefinable setpoint values for the position of the actuator, it results in the regulation of the position of the actuator to the corresponding predefined setpoint value being needlessly slow. A better approach is to activate this slow setpoint value change limitation only when the predefined setpoint value is between the stop and a predefined threshold value assigned to the stop.

BRIEF SUMMARY OF THE INVENTION

The method and the device according to the present invention for controlling an actuator have the advantage over the related art in that, for the reaching of the first setpoint value by, a second setpoint value is initially predefined, that a change in the setpoint value for the position of the actuator is limited to the second setpoint value according to a second setpoint value change limitation, and that, when the amount of change in the setpoint value to the first setpoint value using the first setpoint value change limitation would be greater than the change in the setpoint value to the second setpoint value using the second setpoint value change limitation, a first setpoint value being predefined for the setpoint value, and the change in the setpoint value for the position of the actuator is limited to the first setpoint value according to the first setpoint value change limitation. In this way, a two-stage setpoint value change limitation may be executed in particular for a first setpoint value in the proximity of a stop of the actuator. Using the second setpoint value change limitation, the setpoint value is initially moved toward the second predefined setpoint value and subsequently toward the first predefined setpoint value using the first setpoint value change limitation. The move of the setpoint value toward the second predefined setpoint value may be allowed with a greater setpoint value change, and thus quicker, than the subsequent move of the setpoint value toward the first predefined setpoint value. The second setpoint value change limitation is then set lower than the first setpoint value change limitation. Therefore, in the event that the first predefined setpoint value is situated in the proximity of the stop, the setpoint value could be changed comparatively quickly toward the first predefined setpoint value in a certain limited range dependent on the second predefined setpoint value. The comparatively slow setpoint value change limitation is then necessary only on the last stretch of the path leading to the setpoint value up to the first predefined setpoint value. The regulation for setting the actuator is thus not needlessly slowed.

It is particularly advantageous when the first and the second setpoint value change limitations are executed only when the first setpoint value is between a stop of the actuator and a predefined threshold value assigned to the stop. A first predefined setpoint value, which is not in the stop proximity, i.e., which is not between the stop and the predefined threshold value assigned to the stop, is able, when the threshold value is suitably selected, to be approached by the actuator at a speed as high as possible without having to fear damage to the actuator by the stop. However, if the first setpoint value is between the stop and the predefined threshold value assigned to the stop, it is furthermore ensured that, due to the two-stage setpoint value change limitation, the first setpoint value is initially approached as quickly as possible and is subsequently approached sufficiently slowly in order to prevent damage to the actuator by the stop.

It is particularly simple to select the second predefined setpoint value to be equal to the predefined threshold value.

The two-stage setpoint value change limitation is particularly advantageously effective for avoiding damage to the actuator by the stop, when, as described above, the second setpoint value change limitation is selected to be lower than the first setpoint value change limitation.

The setpoint value change limitation is implemented in a simple manner when the setpoint value for the first setpoint value change limitation is filtered using a first time constant and when the setpoint value for the second setpoint value change limitation is filtered using a second time constant.

The first time constant may be selected in an advantageous manner to be greater than the second time constant in order to achieve that the second setpoint value change limitation is lower than the first setpoint value change limitation.

It is advantageous when one of the two setpoint value change limitations is executed via a ramp function and the other of the two setpoint value change limitations is executed via filtering. This is particularly advantageous in systems in which an asymptotic approach toward the stop position is too slow. Another advantage is that the speed with which the setpoint value of the actuator is allowed to approach the stop may be directly predefined using this method.

Moreover, it is particularly advantageous when the second setpoint value is selected to be farther away from a stop of the actuator than the first setpoint value. The described advantage may be achieved in this way, whereby, due to the two-stage setpoint value change limitation, the setpoint value may initially be moved toward the second setpoint value as quickly as possible and subsequently moved toward the first predefined setpoint value, which is closer to the stop, as slowly as possible in order to avoid damage to the actuator by the stop.

DETAILED DESCRIPTION OF THE INVENTION

Figure 1:
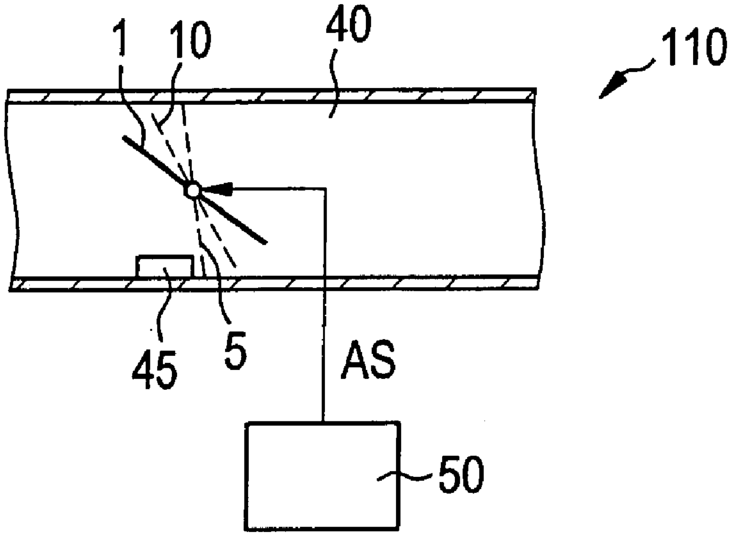
FIG. 1 shows a schematic illustration of an internal combustion engine.

In FIG. 1, reference numeral 110 indicates a detail of an internal combustion engine which drives a vehicle, for example. The internal combustion engine may be designed as a gasoline engine or a diesel engine. Fresh air is supplied to the engine via an intake port 40. An actuator 1 is situated in intake port 40. Actuator 1 is designed as a throttle valve, for example. A different air mass flow is introduced into intake port 40 depending on the position of throttle valve 1. A lower stop of throttle valve 1 in intake port 40 is indicated in FIG. 1 by reference numeral 45. Moreover, FIG. 1 shows a first setpoint value 5 for the position of throttle valve 1 and a second setpoint value 10 for the position of throttle valve 1 using dashed lines, first setpoint value 5 being closer to lower stop 45 than second setpoint value 10. The throttle valve 1 is controlled by a control signal AS from a controller 50 for implementing a driver intent, for example. Control signal AS may be a pulse width-modulated signal, for example, different positions of actuator 1 in intake port 40 resulting for different pulse duty factors of pulse width-modulated control signal AS.

Figure 3:
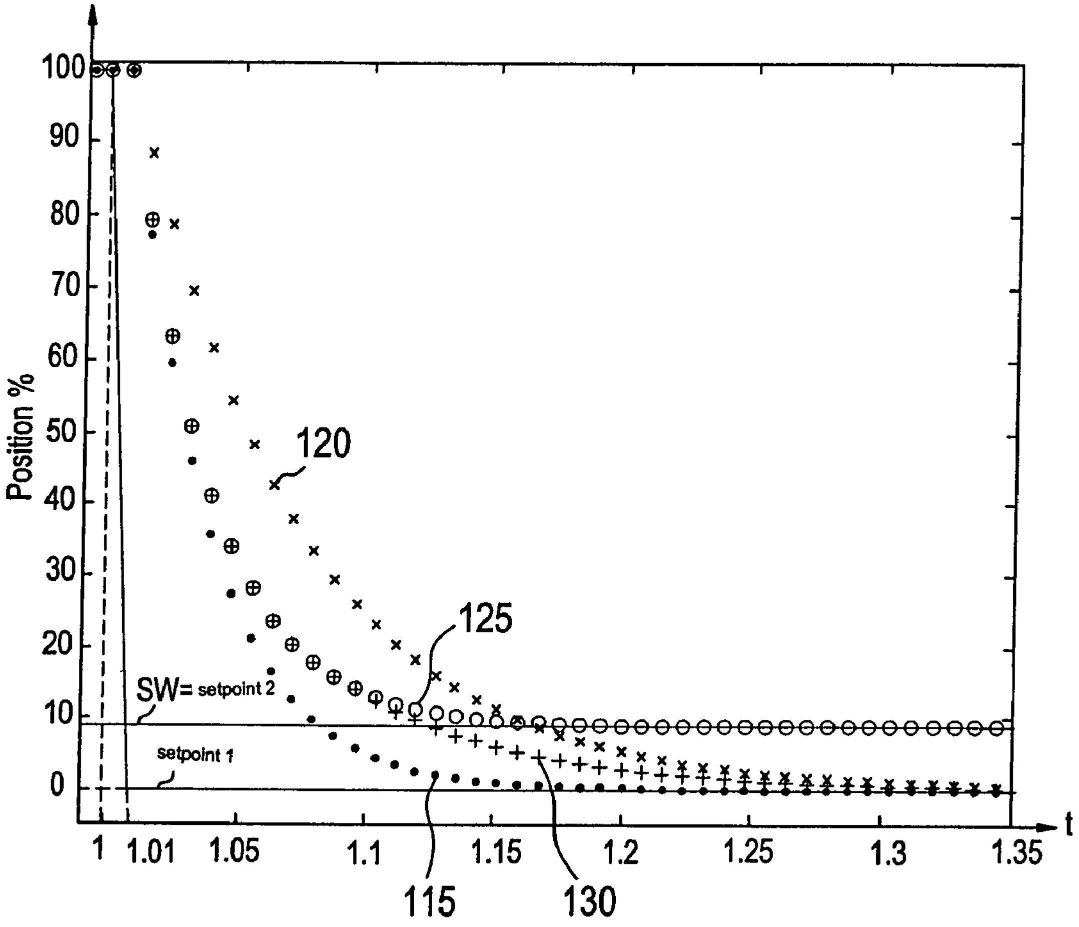
FIG. 3 shows a diagram with different setpoint value curves for the position of an actuator over time.

In FIG. 3, the position of throttle valve 1 is plotted over time t in seconds. The position of throttle valve 1 is indicated as a percentage of the opening degree. Value 0% corresponds to the state of a completely closed throttle valve 1, i.e., throttle valve 1 is positioned directly at lower stop 45. Value 100% for the position of throttle valve 1 corresponds to a completely opened throttle valve 1. FIG. 3 shows a first setpoint value for the position of throttle valve 1 using "Setpoint 1." This first setpoint value setpoint 1 for the position of throttle valve 1 is located initially at value 100% for completely opened throttle valve 1.

Approximately at point in time one second, first setpoint value setpoint 1 jumps downward from value 100% to reach value 0% approximately at point in time 1.01 seconds. First setpoint value setpoint 1 remains there at least until point in time 1.35 seconds. Starting at point in time 1.01 seconds, first setpoint value setpoint 1 corresponds approximately to lower stop 45. The first setpoint value indicated with reference numeral 5 in FIG. 1 does not directly correspond to lower stop 45, but is, however, indicated close to the stop. One should generally act on the assumption that first setpoint value 5 indicates a position of throttle valve 1 in the proximity of lower stop 45, but the special event may occur as in FIG. 3 where first setpoint value 5, indicated in FIG. 3 with setpoint 1, corresponds directly to lower stop 45 and thus to completely closed throttle valve 1 after the jump shown in FIG. 3. All first setpoint values 5 that are closer to lower stop 45 than a predefined threshold value SW after the jump are referred to as "close to the stop".

Predefined threshold value SW may be suitably applied on a test bench, for example. Predefined threshold value SW may be applied in such a way, for example, that all first setpoint values 5 below predefined threshold value SW are so close to lower stop 45 that they may not be predefined abruptly but rather with a sufficient setpoint value change limitation to safely avoid damage to throttle valve 1 by lower stop 45. In the present example according to FIG. 3, predefined threshold value SW is applied at a value between 9 and 10 percent of the position of throttle valve 1. Since first setpoint value setpoint 1 is below predefined threshold value SW after the jump, it may not be predefined abruptly, as shown in FIG. 3, but rather only under consideration of a first setpoint value change limitation. Such a setpoint value change limitation is achieved with the aid of low-pass filtering, for example. The change in the setpoint value for the position of throttle valve 1 from value 100% to value 0% is limited due to low-pass filtering with a predefined time constant. Reference numeral 115 indicates a first curve of the setpoint value for the position of throttle valve 1 which is achieved by low-pass filtering the curve of first setpoint value setpoint 1 with a second time constant of 35 ms. Although this results in a comparatively quick adaptation of the setpoint value of throttle valve 1 to first predefined setpoint value setpoint 1, it is, however, in particular from below predefined threshold value SW until the first predefined setpoint value setpoint 1 is reached too quickly to prevent throttle valve 1 from damage by lower stop 45. A second possible curve of the setpoint value is indicated by reference numeral 120 which is formed by low-pass filtering of the curve of first predefined setpoint value setpoint 1 with a first time constant of 70 ms. Although the setpoint value curve formed hereby is sufficiently slow in particular from below predefined threshold value SW until predefined setpoint value setpoint 1 is reached to safely prevent damage to throttle valve 1 during impact on lower stop 45, it is too slow starting from position 100% until predefined threshold value SW is reached.

It is intended according to the present invention to find a compromise between two different setpoint value curves which, starting from completely opened throttle valve 1 until predefined threshold value SW is reached, approaches the target value of first predefined setpoint value setpoint 1 as quickly as possible. At the latest when the setpoint value curve falls below predefined threshold value SW, the setpoint value should reach first predefined setpoint value setpoint 1 slowly enough that damage to throttle valve 1 by lower stop 45 is safely prevented. The goal is, for example, to find a compromise between first setpoint value curve 115 and second setpoint value curve 120, first setpoint value curve 115 being of interest above predefined threshold value SW and second setpoint value curve 120 being of interest below predefined threshold value SW at the latest. For this purpose, the present invention provides for a two-stage setpoint value change limitation. After the setpoint value jump, a second predefined setpoint value setpoint 2 is selected in a first step as the setpoint to be established for the position of throttle valve 1; setpoint 2 may correspond to predefined threshold value SW, for example, or may be selected to be greater than threshold value SW. Since predefined threshold value SW may be suitably applied on a test bench, for example, in such a way that a corresponding setpoint value change limitation is ensured for damage-free setting of the position of throttle valve 1 to first predefined setpoint value setpoint 1 only for jumps of first predefined setpoint value setpoint 1 below predefined threshold value SW, it is particularly advantageous to select the second predefined setpoint value setpoint 2 to be equal to predefined threshold value SW. It is generally true for the selection of second predefined setpoint value setpoint 2, which is also indicated in FIG. 1 by reference numeral 10, that it is selected to be farther away from lower stop 45 of actuator 1 than first predefined setpoint value setpoint 1.

This is illustrated in FIG. 3 as an example. Until second predefined setpoint value setpoint 2 is reached, a comparatively quick setpoint value curve may be selected. At the latest when the setpoint value curve falls below predefined threshold value SW, a switch may be made to an adequately slow setpoint value curve. Such an ideal setpoint value curve is indicated by reference numeral 130. It is assumed here that in a first step of the setpoint value setting, the setpoint value jump takes place at point in time one second only up to second predefined setpoint value setpoint 2, in the present example up to predefined threshold value SW. This jump to second predefined setpoint value setpoint 2 is then low-pass filtered in this example with the second time constant of 35 ms so that second setpoint value setpoint 2 is approached as quickly as possible according to a third setpoint value curve indicated in FIG. 3 by reference numeral 125. As soon as the amount of the change of the setpoint value of, for example, second setpoint value curve 120 calculated in parallel with the first time constant 70 ms becomes greater than the amount of the change of third setpoint value curve 125, the setpoint value curve is continued by low-pass filtering of first predefined setpoint value setpoint 1 with the first time constant 70 ms. This results in ideal setpoint value curve 130 which initially approaches second predefined setpoint value setpoint 2 as quickly as possible and then reaches first predefined setpoint value setpoint 1 adequately slowly in order to safely prevent throttle valve 1 from damage by lower stop 45.

Figure 2:
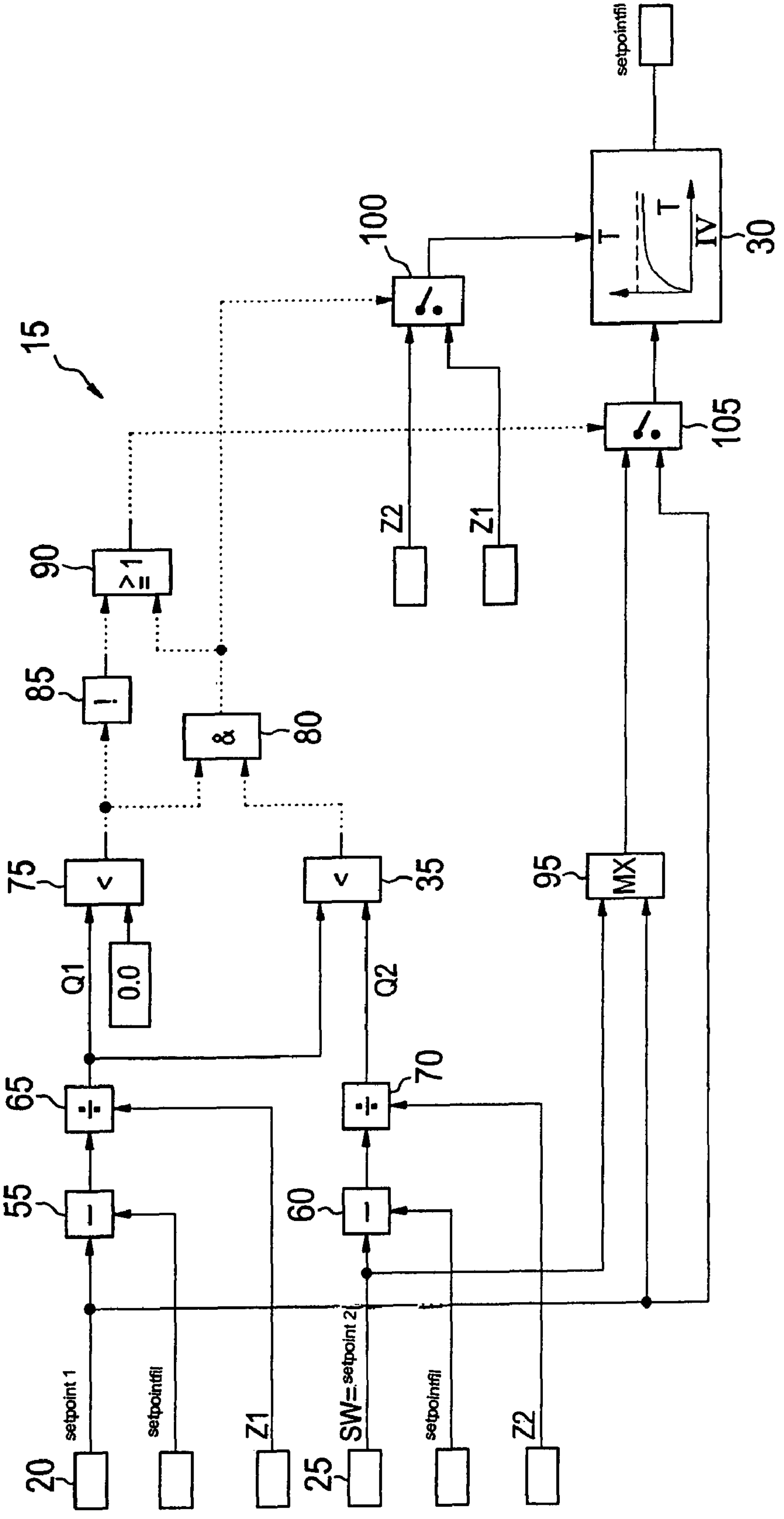
FIG. 2 shows a function diagram for explaining the method and the device according to the present invention.

FIG. 2 shows a function diagram which explains the method and the device according to the present invention in greater detail. The function diagram is indicated in FIG. 2 by reference numeral 15 and may be implemented in controller 50 in the form of software and/or hardware as the device according to the present invention. The sequence of the method according to the present invention is made clear on the basis of function diagram 15. The first input means 20 predefine first setpoint value 1 or the time curve of first setpoint value setpoint 1 according to FIG. 3, for example, and as a function of a driver intent, for example. A low-pass 30 which releases a filtered setpoint value setpointfil at regular sampling intervals is also provided. At each sampling interval, filtered setpoint value setpointfil, present at this sampling interval, is subtracted in a first subtractor 55 from first predefined setpoint value setpoint 1, present at this sampling interval. The formed difference setpoint 1—setpointfil at the output of first subtractor 55 is divided in a subsequent first divider 65 by a first predefined time constant Z1 which may be permanently stored in a memory assigned to controller 50. As described above, the value of 70 ms may be selected as first time constant Z1, for example. The output of first divider 65 thus corresponds to the quotient $$\frac{\text{Setpoint 1} - \text{Setpointfil}}{Z1}$$

This quotient is indicated in FIG. 2 by Q1. It is conveyed to a first input of a first comparator 75 and value zero is conveyed to its second input. If first quotient Q1 is less than zero, the output of first comparator 75 is set, otherwise it is reset. The output of first comparator 75 is guided to an inverter 85 whose output is set when its input is reset and whose output is reset when its output is set. The output of inverter 85 is conveyed to a first input of an OR element 90. In addition, the output of first comparator 75 is conveyed to a first input of an AND element 80. In addition, first quotient Q1 as the output of first divider 65 is conveyed to a first input of a second comparator 35. Second input means 25 predefine second setpoint value setpoint 2 as predefined threshold value SW in this example. Second input means 25 may be formed by a memory assigned to controller 50 in which the value applied on a test bench, for example, for predefined threshold value SW is stored. For each sampling interval, filtered setpoint value setpointfil, present at this sampling interval, is subtracted in a second subtractor 60 from second predefined setpoint value setpoint 2 present at this sampling interval so that difference setpoint 2—setpointfil is formed at the output of second subtractor 60. The output of second subtractor 60 is divided in a second divider 70 by a second time constant Z2 which, as described above, may assume the value 35 ms and may also be stored in a memory assigned to controller 50. Thus, this results in a second quotient Q2=

$$\frac{\text{Setpoint 2} - \text{Setpointfil}}{Z2}$$

at the output of second divider 70.

Second quotient Q2 is conveyed to a second input of second comparator 35. The output of second comparator 35 is set when Q1<Q2. The output of second comparator 35 is conveyed to a second input of AND element 80. The output of AND element 80 is only set when its two inputs are set, otherwise it is reset. The output of AND element 80 is conveyed to a second input of OR element 90 and as a control signal to a first controlled switch 100. The output of OR element 90 is set when one of its two inputs is set, otherwise it is reset. The output of OR element 90 is conveyed to a second controlled switch 105 as a control signal. First setpoint value setpoint 1 is conveyed to a first input of a maximum selector 95 and to a first input of second controlled switch 105. Second setpoint value setpoint 2 is conveyed to a second input of maximum selector 95. Maximum selector 95 selects the maximum of its two inputs, i.e., the maximum from first predefined setpoint value setpoint 1 and second predefined setpoint value setpoint 2 and conveys this maximum to a second input of controlled switch 105. Second controlled switch 105 connects the output of maximum selector 95 to an input of low-pass 30 when the output of OR element 90 is reset. Otherwise, second controlled switch 105 connects the input of low-pass 30 to first input means 20 and thus to first predefined setpoint value setpoint 1. The output of first controlled switch 100 predefines the time constant for low-pass 30. First controlled switch 100 connects the memory having first predefined time constant Z1 to the input for the time constant of low-pass 30 when the output of AND element 80 is set, otherwise, the first controlled switch connects the memory having second predefined time constant Z2 to the time constant input of low-pass 30.

For forming filtered setpoint value setpointfil, low-pass 30 filters the output of second controlled switch 105 using the appropriate set time constant. First comparator 75 ensures that the two-stage setpoint value change limitation is carried out only when first setpoint value setpoint 1 is smaller than filtered setpoint value setpointfil and filtered setpoint value setpointfil has a temporally decreasing curve toward lower stop 45. Otherwise, first setpoint value setpoint 1 is only filtered by low-pass filter 30 using second predefined time constant Z2. First comparator 75 thus checks whether throttle valve 1 is moving in the closing direction, thus toward lower stop 45, i.e., filtered setpoint value setpointfil changes in the direction of lower stop 45. Second comparator 35 checks which of the two setpoint value change limitations allows the greatest step toward lower stop 45. The setpoint value change limitation that enables the greater step for the setpoint value toward lower stop 45 and which configures low-pass filter 30 correspondingly in the described manner is always selected. If low-pass filter 30, having first predefined setpoint value setpoint 1 as the input value and the slower first time constant Z1, makes a greater step toward lower stop 45 than low-pass filter 30 having second predefined setpoint value setpoint 2 as the input value and the quicker second filter time constant Z2, the former configuration having first predefined setpoint value setpoint 1 and first filter time constant Z1 is selected, otherwise, the filter configuration having second predefined setpoint value setpoint 2 is selected, which is greater than first predefined setpoint value setpoint 1 and second predefined time constant Z2.

As long as first predefined setpoint value setpoint 1 is greater than predefined threshold value SW, it is filtered using quicker second time constant Z2 so that the setpoint value approaches first predefined setpoint value setpoint 1 as quickly as possible. When first predefined setpoint value setpoint 1 falls below predefined threshold value SW, the method according to the present invention shown in FIG. 2 provides for second predefined setpoint value setpoint 2 to initially be approached via low-pass filter 30 using quicker second time constant Z2 until the filtered setpoint value curve is so strongly decelerated that filtering using slower time constant Z1 and first predefined setpoint value setpoint 1 as the input value is quicker. Subsequently, the switch between the two different input values and the two different time constants takes place and first predefined setpoint value setpoint 1 is then approached using slower first filter time constant Z1.

It is possible in this way to smoothly switch a setpoint value change limitation from a high-speed adjustment to a slower, close to the stop, adjustment of the setpoint value to the correspondingly predefined setpoint value when first predefined setpoint value setpoint 1 is below predefined threshold value SW. As long as first predefined setpoint value setpoint 1 is in the range above predefined threshold value SW or when it moves toward the range above predefined threshold value SW, slight overshoots or undershoots in the setpoint value are allowed because they make it possible for first predefined setpoint value setpoint 1 to be reached quicker.

The function diagram according to FIG. 2 shows a controller for adjusting the setpoint value for the position of throttle valve 1 to first predefined setpoint value setpoint 1. The controller implemented by the function diagram in FIG. 2 has the advantage over systems which operate only with first filter time constant Z1 as soon as first predefined setpoint value setpoint 1 is below predefined threshold value SW, that the controller according to the function diagram in FIG. 2 may be designed with a higher loop gain.

Third setpoint value curve 125 shows the quickest possible approach of the setpoint value to predefined threshold value SW in which occurring undershoots in the setpoint value curve are still controllable. Ideal setpoint curve 130 uses this quick third setpoint value curve 125 until it is decelerated too much. Subsequently, ideal setpoint value curve 130 continues to move slowly toward first predefined setpoint value setpoint 1. If first setpoint value curve 115 would have been used until predefined threshold value SW was reached and then directly switched to second setpoint value curve 120 with the slower time constant, the changing speed of the setpoint value in the range of predefined threshold value SW would have been too high.

Using the method and the device according to the present invention, a second filter time constant Z2 for low-pass filter 30 may be selected to be so quick that the controller according to the function diagram in FIG. 2 is speed-optimized in the range of the setpoint value above predefined threshold value SW. Nevertheless, mechanical lower stop 45 is approached after switching to first filter time constant Z1 so slowly that throttle valve 1 is not damaged. Throttle valve 1 may thus be completely closed in order to minimize air leakage.

An alternative arises when the setpoint value for the second setpoint value change limitation is first filtered using a quick, i.e., a small, second time constant and the first setpoint value change limitation is then implemented as a ramp function for the setpoint value. This is particularly advantageous in systems in which an asymptotic approach toward the stop position is too slow. Another advantage is that using this method makes it possible to directly predefine the speed with which the setpoint value of the actuator is allowed to approach the stop. Conversely, the second setpoint value change limitation may initially be implemented as a ramp function for the setpoint value and the setpoint value for the first setpoint value change limitation may subsequently be filtered using the first time constant.

The exemplary embodiment has been described above based on an actuator 1 designed as a throttle valve. It is possible to use the present invention for any electrically controlled actuators, e.g., also for a charge motion valve, an exhaust gas recirculation valve, a bypass valve for a compressor, etc. Moreover, use of actuator 1 is not limited to an internal combustion engine or a motor vehicle, but may be provided for any applications in which a mass flow may be influenced by the change in the position of an actuator.

In the above description, low-pass filtering with different filter time constants has been used to differently limit the change in the setpoint value. However, the present invention is not limited to the use of filtering for the setpoint value change limitation. A setpoint value change limitation may also be carried out by calculating a gradient of the setpoint value curve over time and its comparison with a predefined limiting value. If the calculated gradient falls below the predefined limiting value, no setpoint value change limitation takes place, otherwise the setpoint value change is limited to the predefined limiting value. Different setpoint value change limitations may then be implemented using different limiting values. Other methods for setpoint value change limitation, known to those skilled in the art, may be used for implementing the present invention.

Selecting two different predefined limiting values makes it possible to implement two different setpoint value change limitations, one being lower than the other. A lower setpoint value change limitation results from the greater predefined limiting value for the setpoint value change limitation. A greater absolute value of the setpoint value change is possible in this case. The limitation of the setpoint value change is thus smaller.

According to the present invention, the first and the second setpoint value change limitation, i.e., the low-pass filtering using the first and the second predefined filter time constant in the above-described example, may be executed only when first predefined setpoint value setpoint 1 is between lower stop 45 of actuator 1 and predefined threshold value SW assigned to lower stop 45. First predefined setpoint value setpoint 1 may also correspond to lower stop 45 as shown in FIG. 3. If first predefined setpoint value setpoint 1 is above predefined threshold value SW, a setpoint value change limitation or filtering may be omitted. The same is true when first predefined setpoint value setpoint 1 corresponds to predefined threshold value SW. In this case, however, low-pass filtering using a single filter time constant according to third setpoint value curve 125 may also be carried out as shown in FIG. 3. Second filter time constant Z2=35 ms is selected in the example in FIG. 3.

Lower stop 45 of actuator 1 has been considered in the above-described example. In a similar manner, it is possible to use the described method and the described device according to the present invention also for the upper stop of actuator 1, the output of first comparator 75 being set when Q1 is greater than zero and the output of first comparator 75 is otherwise reset. Furthermore, in this case the output of second comparator 35 is set when Q1>Q2 and the output of second comparator 35 is otherwise reset. In this case, maximum selector 95 in FIG. 2 changes into a minimum selector. Moreover, the function diagram in FIG. 2 may also be used in the case of the upper stop. Predefined threshold value SW for the upper stop is, for example, between 90 and 91 percent of the position of actuator 1 according to FIG. 3 and the upper stop corresponds to 100 percent of the position of actuator 1. Here also, second predefined setpoint value setpoint 2 may be selected to be equal to the predefined threshold value.

What is claimed is:

1. A method for controlling an actuator, comprising:

predefining a first setpoint value for a position of the actuator;

predefining a first setpoint value change limitation defining a limit of a change in an instantaneous setpoint value for the position of the actuator to the first setpoint value;

predefining a second setpoint value for a position of the actuator, wherein the predefined second setpoint value is provided for reaching the first setpoint value; and predefining a second setpoint value change limitation defining a limit of a change in an instantaneous setpoint value for the position of the actuator to the second setpoint value;

wherein, if a value of a change of the instantaneous setpoint value to the first setpoint value using the first setpoint value change limitation is greater than a value of a change of the instantaneous setpoint value to the second setpoint value using the second setpoint value change limitation, the first setpoint value is selected for controlling the actuator, and the change of the instantaneous setpoint value for the position of the actuator is limited to the first setpoint value according to the first setpoint value change limitation.

2. The method as recited in claim 1, wherein the first and the second setpoint value change limitations are in effect only when the first setpoint value is between a stop of the actuator and a predefined threshold value assigned to the stop of the actuator.

3. The method as recited in claim 2, wherein the second predefined setpoint value is selected to be equal to the predefined threshold value assigned to the stop of the actuator.

4. The method as recited in claim 2, wherein the second setpoint value change limitation is selected to be lower than the first setpoint value change limitation.

5. The method as recited in claim 2, wherein the first setpoint value associated with the first setpoint value change limitation is filtered using a first predefined time constant and the second setpoint value associated with the second setpoint value change limitation is filtered using a second predefined time constant.

6. The method as recited in claim 5, wherein the first predefined time constant is selected to be greater than the second predefined time constant.

7. The method as recited in claim 1, wherein one of the first and second setpoint value change limitations is achieved by a ramp function and the other of the first and second setpoint value change limitations is achieved by filtering.

8. The method as recited in claim 1, wherein the second setpoint value is selected to be farther away from a stop of the actuator than the first setpoint value.

9. A device for controlling an actuator, comprising:

a first input unit configured to predefine a first setpoint value for a position of the actuator;

a first limiting unit configured to predefine a first setpoint value change limitation defining a limit of a change in an instantaneous setpoint value for the position of the actuator to the first setpoint value;

a second input unit configured to predefine a second setpoint value for a position of the actuator, wherein the predefined second setpoint value is provided for reaching the first setpoint value;

a second limiting unit configured to predefine a second setpoint value change limitation defining a limit of a change in an instantaneous setpoint value for the position of the actuator to the second setpoint value; and a checking unit configured to determine whether a value of a change of the instantaneous setpoint value to the first setpoint value using the first setpoint value change limitation is greater than a value of a change of the instantaneous setpoint value to the second setpoint value using the second setpoint value change limitation, and if the value of the change of the instantaneous setpoint value to the first setpoint value using the first setpoint value change limitation is greater than the value of a change of the instantaneous setpoint value to the second setpoint value using the second setpoint value change limitation, the first setpoint value predefined by the first input unit is selected for controlling the actuator, and the change of the instantaneous setpoint value for the position of the actuator is limited by the first limiting unit to the first setpoint value according to the first setpoint value change limitation.

* * * * *